Aug. 1, 1967  R. J. MACI ET AL  3,333,483
TORQUE-SPLITTING MECHANISM

Filed March 19, 1965  2 Sheets-Sheet 1

INVENTORS
Raymond J. Maci &
BY Dan R. Rowland

*A. M. Heiter*
ATTORNEY

INVENTORS
Raymond J. Maci &
Dan R. Rowland

ATTORNEY

3,333,483
TORQUE-SPLITTING MECHANISM
Raymond J. Maci, Indianapolis, Ind., and Dan R. Rowland, Saginaw, Mich., assignors to General Motors Corporation, Detroit, Mich., a corporation of Delaware
Filed Mar. 19, 1965, Ser. No. 441,239
20 Claims. (Cl. 74—424.8)

This invention relates generally to torque-splitting mechanisms and particularly to ball spline differential actuators. More specifically this invention relates to differential actuators which may be utilized in a power train for distributing apply torque equally to separate reaction devices.

The service brake power trains in most modern vehicles includes a torque-splitting differential actuator for applying equal torque to each service brake regardless of inequality of brake plate clearance. This prevents the possibility of too much pressure being applied to any one brake which would result in uneven braking effort and shorten service brake life.

Prior service brake power trains including their differential brake actuators or equalizers are generally reliable and satisfactory as evidenced by their widespread use for many years in varied vehicle application. However, these trains often involved a comparatively complex system of levers, pulleys or gears having an awkward and bulky design. In many cases the equalizers were exposed beneath the vehicle and were subject to harsh environmental conditions, particularly in off-road vehicles.

The present invention improves on these prior vehicle brake power trains by providing a new compact and highly reliable vehicle brake power train which includes a single apply shaft and differential brake actuator or equalizer which may be installed within the vehicle power train. This provides needed protection for the vehicle brake power train and facilitates vehicle assembly. Furthermore, the invention provides for improved antifriction means in the form of ball bearings within the differential actuator or equalizer to give long service life and reduce the possibility of repair and replacement of the brake power train.

It is an object of this invention to provide a ball spline antifriction differential actuator for applying equal torque to separate reaction members.

Another object of this invention is to provide a ball spline differential brake apply actuator in which balls provide anti-friction means connecting an apply means to rotatable brake apply members and in which the brake apply members are relatively rotatable when reaction forces retarding apply member rotation are unequal.

Another object of this invention is to provide a new and improved torque-equalizing actuator which will divide the torque applied through a single apply shaft equally to two separate brake cams independent of amount of brake cam travel.

Another object of this invention is to provide a new and improved torque-equalizing mechanism for applying equal torque to left and right vehicle brakes in which the torque-equalizing mechanism may be located and supported within the vehicle power train housing.

Another object of this invention is to provide a torque-equalizing actuator which incorporates differential structure to allow movement of one reaction member without corresponding movement of a second reaction member in one condition of operation but with simultaneous movement in another condition of operation.

A further object of this invention is to provide a ball spline differential between a torque-apply member and first and second reaction members with the ball spline differential including a slidable coupling which rotates with the apply member and which imparts differential rotation to the reaction members in one condition of operation and equal rotation in another condition of operation.

Another object of this invention is to provide a differential mechanism having a rotatable input apply member, a coupling mounted on this member for rotation therewith and for longitudinal sliding movement with respect thereto, left and right-hand lead structures for operatively connecting the coupling respectively to the first and second rotatable output or reaction members to rotate both reaction members simultaneously when retarding forces on the reaction members are equal, and for rotating one reaction member through an angle greater than the angle which the apply member has been rotated without corresponding rotation of the other reaction member when the last-mentioned reaction member experiences a load greater than the load on the first-mentioned reaction member.

Other objects, features and advantages of this invention will be apparent by referring to the following detailed description and accompanying drawings, in which.

Figure 1:
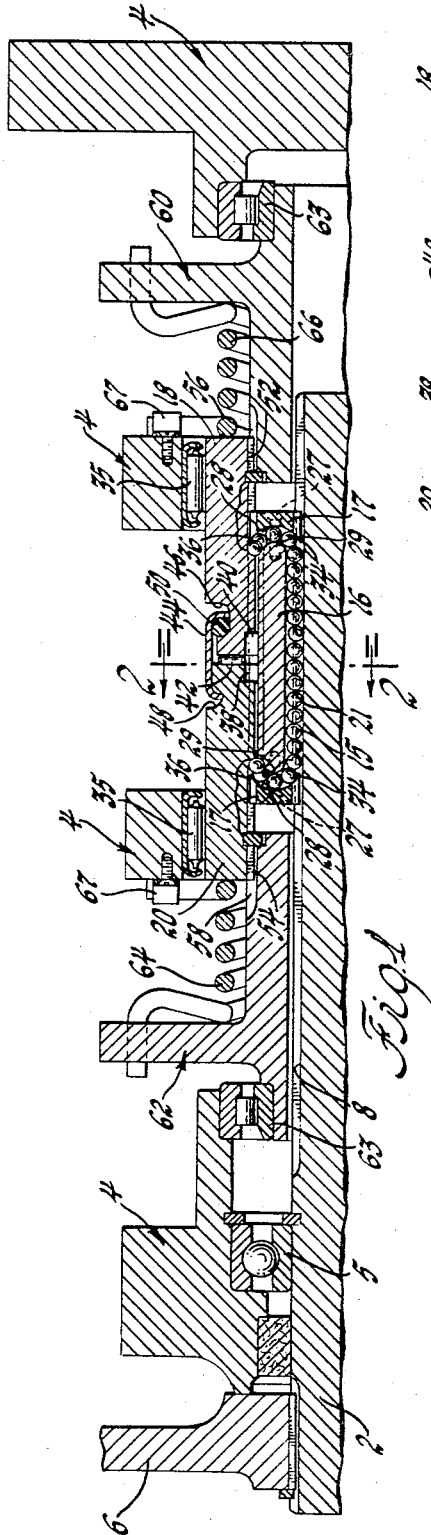
FIGURE 1 is a view of one-half of a generally symmetrical longitudinal section of a differential mechanism embodying one form of the invention.

The first embodiment of this invention, illustrated as a brake apply mechanism mounted in a transmission housing, includes a cylindrical apply shaft 2 rotatably mounted by ball bearing 5 in a support structure 4 of a transmission housing. A single brake apply lever 6 is splined to one end of this shaft which is operatively connected to and can be rotated by suitable means such as a conventional, single brake pedal mounted in the operator compartment of a vehicle, not shown. The apply shaft is elongated and preferably has three longitudinally-extending straight ball tracks 7, 8 and 9 in its periphery, equally spaced from each other. Each track provides part of a recirculating race for three separate ball trains 10, 12 and 14, formed by anti-friction spherical balls 15. The other tracks which form the races for the ball trains, are provided in coupling member 16, two coupling member end caps 17, and reaction members 18 and 20, all of which will be further described below.

Figure 2:
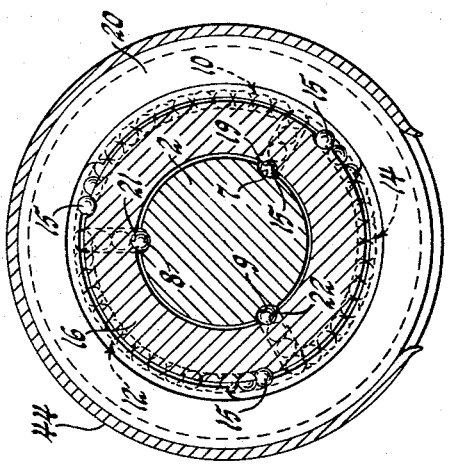
FIGURE 2 is a view generally along line 2—2 of FIGURE 1 but showing a full section.

As best shown in FIGS. 1 and 2, the apply shaft supports the cylindrical coupling 16 near one end thereof. This coupling has three straight longitudinally-extending internal straight ball tracks 19, 21 and 22 which are aligned with and match the tracks 7, 8 and 9 in the apply shaft. The outer periphery of coupling 16 also has three sets of external tracks formed therein, each of which generally describe a V with a 90° included angle.

Figure 4:
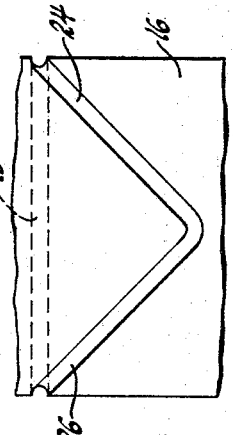
FIGURE 4 is a developed view of another part of the structure of FIGURE 1 showing helical tracks which forms another part of the ball race.

Each V is formed by working tracks 24 and 26 which have opposite leads; each track describes a 45° helix angle. As will appear from FIGS. 1 and 4, each V has its outer extremities communicating with one of the three longitudinally-extending tracks 19, 21 and 22.

Figure 3:
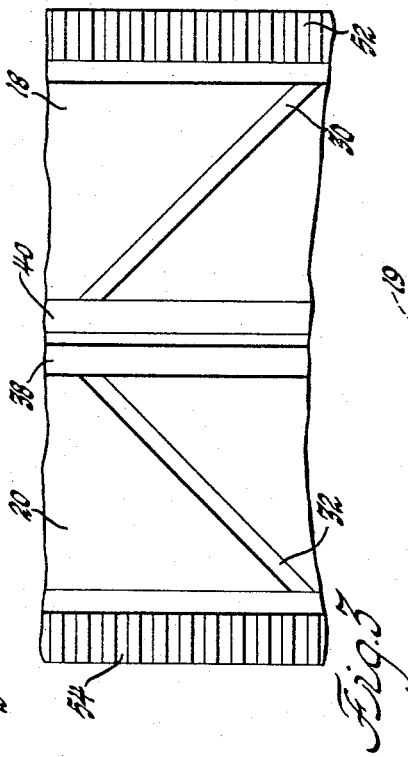
FIGURE 3 is a developed view of part of the structure of FIGURE 1 showing helical tracks which form part of a ball race.

The end caps 17, having generally the same radial dimensions as coupling 16, are secured to the ends of the coupling member 16 by suitable means, such as fasteners 27. Both of the end caps are formed with internal curved tracks 28 which cooperate with outwardly-curved track portions 29, formed in the ends of the coupling member 16, to provide passages for the balls 15. These passages connect the races, formed by the aligned straight tracks in the apply shaft and coupling, with the helical races formed by the tracks in the outer periphery of the coupling member and the cooperating helical tracks 30 and 32 in the reaction members 18 and 20. Tracks 30 and 32 have opposite leads respectively in the reaction members 18 and 20 and match the working tracks in the coupling member, as will be apparent if the FIG. 3 development is folded onto the development of FIG. 4. Thus reaction member 18 has its working tracks 30 matching and sequentially aligned with the helical working tracks 24 in the coupling member while the reaction member 20 has its helical working tracks 32 matching and sequentially aligned with the helical tracks 26 in the coupling member. The end caps are provided with suitable ball deflector fingers 34 which are received in the straight tracks 8 in the brake apply shaft and angularly-extending ball deflector fingers 36 disposed in and at the pitch angle of the helical tracks in the reaction members 18 and 20.

As indicated above, the tracks in the apply shaft, coupling member, end caps and reaction members provide three separate races or tracks for recirculation of the ball trains 10, 12, 14. The reaction members are preferably cut back or recessed at 38 and 40 to provide load relief and assist the balls in making the 90° turn at the apex of each V in the coupling member and to eliminate ball track interference when the coupling 16 slides axially to left or right during certain operating conditions. The reaction members 18 and 20, positioned side-by-side on the coupling member 16, are rotatably mounted in the supporting structure 4 by needle bearings 35 and are separated by a radial needle thrust bearing 42. To permit relative rotation of the reaction members and to prevent their axial separation, a suitable clamp 44 is utilized. This clamp has opposing flanges which are received in suitable peripheral grooves 46 and 48, provided in the reaction members. As illustrated in FIG. 1, anti-friction ball means 50 are positioned between the one flange of the clamp 44 and the edge of the reaction member defining groove 46 to facilitate relative rotation of the reaction members.

The reaction members have internal splines 52, 54 at one end of each member which mesh with external splines 56 and 58 of brake apply cams 60 and 62. Roller bearing 63 rotatably mounts the brake apply cams in support structure 4, as illustrated. Torsin springs 64 and 66, each having one end anchored to transmission housing structure by fastener means 67 and the other end secured in suitable opening in the brake apply cams, are utilized to return the cams to their FIG. 1 position when the apply shaft is released by the vehicle operator.

It will be appreciated that the brake apply cams are adapted to be connected to separate vehicle brakes (not shown) and upon reverse rotation of the lever 6 and apply shaft 2, the brake cams are rotated to apply the vehicle brakes to separate outputs such as separate outputs of a cross-drive transmission.

Figure 5:
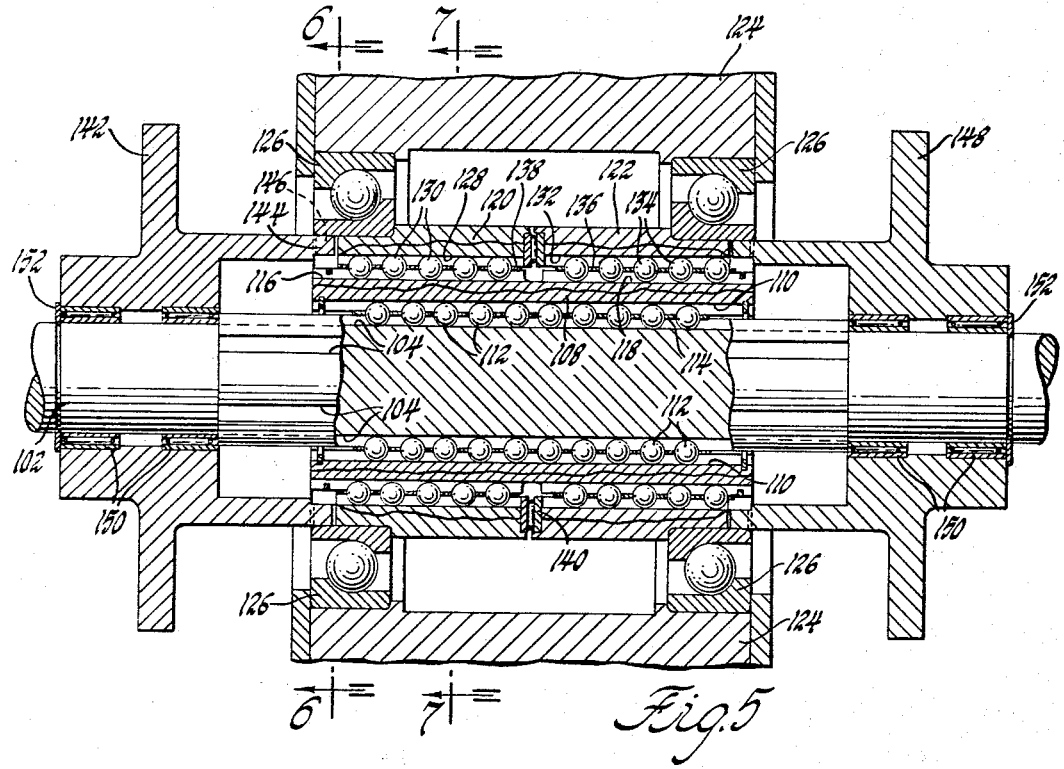
FIGURE 5 is a longitudinal section of a second embodiment of this invention, partly in cross section.
Figure 7:
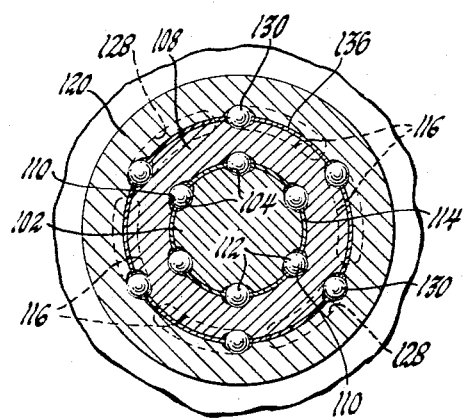
FIGURE 7 is a view taken generally along line 7—7 of FIGURE 5 in the direction indicated.
Figure 6:
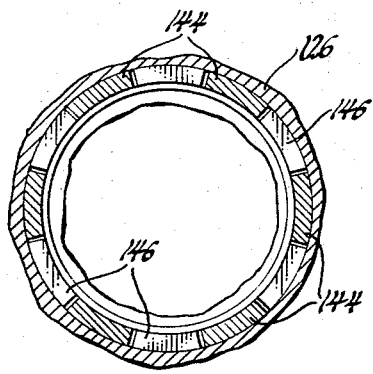
FIGURE 6 is across sectional view of FIGURE 5 taken along the line 6—6 of FIGURE 5 looking in the direction of the arrows.

In a second embodiment of the invention illustrated in FIGS. 5–7, an elongated brake apply shaft 102 may be operated by a lever as in the first embodiment described above. This shaft is provided with six peripheral straight ball tracks 104. A cylindrical coupling member 108 has six internal straight ball tracks 110 which match tracks 104 to form races for anti-friction balls 112. These balls are preferably spaced in their races by a cylindrical cage 114.

In one half of the outer periphery of this coupling member there is a series of equally-spaced helical ball tracks 116 which have right-hand leads; similarly, there is in the other half a series of equally spaced helical ball tracks 118 having left-hand leads. Preferably all of these tracks describe helix angles of about 20°. First and second cylindrical reaction members 120 and 122, rotatably supported in support structure 124 of a transmission housing by ball thrust bearing 126, are mounted on the coupling 108. The first reaction member has a series of ball tracks 128 with right-hand leads which match the tracks 116 and form ball races for anti-friction balls 130. In a similar manner the second reaction member 122 has ball tracks 132 with left-hand leads which match the helical tracks 118 to provide ball races for anti-friction balls 134. The balls in the left and right-hand lead ball races are preferably separated by suitably cylindrical ball cages 136 and 138 which may be centered by springs (not shown) if desired. As shown, the reaction members are separated by needle thrust bearings 140.

The first reaction member is connected to a brake apply cam 142 by suitable meshing teeth 144 and 146 provided respectively on the ends of the reaction member and the cam 142. In a similar manner the second reaction member is connected by meshing teeth to the brake apply cam 148. As shown, these cams are rotatably mounted on the shaft 102 by needle bearings 150. Appropriate snap type retaining rings 152 may be provided on shaft 102 to prevent axial movement of the cams on the shaft 102.

As in the first embodiment, the brake apply cams are operatively connected to separate braking devices (not shown). Upon forward rotation of these braking cams by forward rotation of the apply shaft, the cams will actuate these braking devices, applying them to the separate outputs of a transmission, such as the aforementioned cross-drive transmission.

*Operation*

Vehicle braking is accomplished by actuation of the lever 6 through, for example, a foot pedal or other similar mechanism located in a driver's compartment. If in FIG. 1, apply shaft 2 is rotated rearwardly into the plane of the drawing by actuation of lever 6 and if the reaction forces on the brake apply cams 60 and 62 are equal, such as would be the case when both vehicle brakes are both making initial simultaneous engagement with their reactions, coupling 16, reaction members 18, 20 and cams 60, 62 will be rotated as a solid unit. This applies equal torque to the both vehicle brakes. Thrust bearing 42 takes up any axial load on reaction members 18 and 20 and prevents their axial movement toward each other. Upon release of lever 6 by the vehicle operator, the torsion springs 64 and 66 will return the cams 60 and 62 to their original position in which the vehicle brakes are not applied.

In the event that, upon rotation of shaft 2, the vehicle brake operated by cam 62 engages its reaction and the vehicle brake operated by cam 60 has made no such engagement, the load on brake apply cam 62 will be much greater than the load on the brake apply cam 60. The greater load will hold cam 62 from further rotation. However, since the shaft 2 is still rotating, the coupling 16, reaction member 18 and apply cam 60 will still experience rotation. Furthermore, since reaction member 20 is held by virtue of its connection with cam 62, the balls 15 in the right-hand lead working races provided by tracks 32 and 26 in the member 20 and coupling 16 will exert an axial resultant force on the coupling 16 causing it to move laterally toward the brake apply cam 62 while it is rotating. Balls 15 in the working race between reaction member 18 and coupling 16 will exert a force on member 18 to cause it to turn more than the turning coupling as the coupling is laterally displaced. Thus, with the 45° working race, a 10° rotation of shaft 2 and coupling 16 will result in a 20° rotation of reaction member 18 and attached cam 60 while the reaction member 20 and cam 62 remain stationary. During this differential movement, the balls 15 of the ball trains will move from the left-hand lead working races across the load relief cut-outs 40 and 38 to the right-hand lead working races. When conditions are such that the retarding forces on the brake apply cams are again equal, they may be equally rotated insofar as possible.

It follows that, if the vehicle brake operated by cam 60 engages its reaction member before engagement of the vehicle brake operated by cam 62, the forces resisting brake apply cam rotation are again unequal. In this condition the brake apply cam 60 is held while the brake apply cam 62 is rotated with coupling 16 rotating while moving laterally toward apply cam 60. Movement of the balls in the trains will be the reverse of that immediately described above.

The operation of the invention embodiment illustrated in FIGS. 5–7 is substantially the same as that in connection with the first embodiment. However, it should be noted that the second embodiment does not include or require the recirculating ball races of the first embodiment since the caged balls produce substantially the same result. It will be understood that any suitable means such as the torsion springs 64 and 66 may be utilized to return the brake apply cams of the second embodiment back to their inactive positions when brake apply force is relieved. Due to the smaller helix angle preferably utilized in the second embodiment, the differential movement possible in the second embodiment will not be as great as in the first embodiment but is still enough to solve brake equalization problems.

It will be appreciated that the ball trains of both embodiments not only provide the connection between the apply shaft, coupling and the reaction members but also provide efficient anti-friction devices enhancing smooth operation and long service of the invention.

From the above, it will be seen that applicants have provided new and improved vehicle brake power train which includes a ball spline differential actuator that divides apply torque equally to both vehicle brakes and which insures simultaneous even braking. Furthermore, applicants' single shaft brake apply structures are particularly adaptable for use within the protection of a transmission housing. It will be understood that the embodiments shown and described above are only illustrative of the invention and that other variations and modifications may be made. It will, thus, be further understood that applicants' invention is not to be confined to that which is shown and described for explanation and illustration but to that set forth in the claims appended hereto.

We claim:

1. In an actuator for applying equal torque to separate outputs, a rotatable input, a plurality of rotatable outputs, coupling means between said input said outputs, antifriction ball means connecting said coupling to said input for rotation thereby and for longitudinal sliding movement relative thereto, additional anti-friction ball means connecting said coupling and said outputs to enable said input to rotate said outputs simultaneously when said outputs experience equal retarding forces and to rotate one of said outputs without rotation of the other of said outputs when said outputs experience unequal retarding forces.

2. The actuator of claim 1 wherein said anti-friction ball means is a recirculating ball train, said ball train having a left-hand lead helical portion connecting said coupling to one of said outputs and a right-hand lead helical portion connecting said coupling to another of said output.

3. The actuator of claim 1 wherein said anti-friction ball means are first, second and third caged ball trains, said first ball train providing a straight ball spline, said second ball train providing a left-hand lead helical ball spline and said third ball train providing a right-hand lead helical ball spline.

4. In an actuator, a rotatable input, a plurality of rotatable outputs, coupling means between said input and said outputs, straight ball spline means between said input and said coupling means enabling said coupling means to rotate with said input and move longitudinally relative to said input, second and third ball spline means for rotating said outputs simultaneously in one condition of actuator operation and for rotating only one of said outputs in another condition of actuator operation, said second ball spline means having a right-hand lead between said coupling means and one of said outputs, and said third ball spline means having a left-hand lead between said coupling means and the other of said outputs.

5. In an actuator, a rotatable input, a plurality of rotatable outputs subject to forces retarding their rotation, a torque transmitting member mounted for rotation with and sliding movement on said input and disposed between said input and said outputs, a plurality of separable antifriction drive units connecting said outputs to said torque transmitting member for conjoint rotation when said input is rotated and the retardation forces on said outputs are equal and operable to impart sliding movement to said torque transmitting member and relative rotation of said outputs when the retardation forces on said outputs are unequal.

6. In an actuator, a rotatable input, a pair of rotatable outputs, rotatable and slidable coupling means operatively connecting said input to said outputs for rotating one of said outputs when said input is rotated and said outputs experience different reaction forces whose relative difference tends to prevent rotation of said other output means, said coupling means having first helical drive-connecting means for connecting said coupling means to one of said outputs and second helical means for connecting said coupling to the other of said outputs, said second helical means having a lead opposite to the lead of said first helical means.

7. In a brake actuator, a rotatable input, independent first and second rotatable outputs, rotatable and slidable coupling means operatively connecting said input to said outputs for rotating one of said outputs when said input is rotated and said outputs experience different reaction forces and for simultaneously rotating both of said outputs when said input is rotated and said outputs experience equal reaction force, said coupling means having first helical drive means for connecting said coupling means to one of said outputs and second helical means for connecting said coupling to the other of said outputs, said second helical means having a lead opposite to the lead of said first helical means.

8. In a brake actuator, a rotatable input, independent first and second rotatable outputs, rotatable and slidable coupling means operatively connecting said input to said outputs for rotating one of said outputs when said input is rotated and said outputs experience unequal reaction forces and for simultaneously rotating both of said outputs when said input is rotated and said outputs experience equal reaction forces, said coupling means having first helical drive means for connecting said coupling means to one of said outputs and second helical drive means for connecting said coupling to the other of said outputs, said second helical means having a lead opposite to the lead of said first helical means, said first and second helical drive means being operatively coupled with each other.

9. In a brake actuator, a rotatable input, independent first and second rotatable outputs, rotatable and slidable coupling means operatively connecting said input to said outputs for rotating one of said outputs when said input is rotated and said outputs experience unequal reaction forces and for simultaneously rotating both of said outputs when said input is rotated and said outputs experience equal reaction forces, said coupling means having first helical drive means for connecting said coupling means to one of said outputs and second helical drive means for connecting said coupling to the other of said outputs, said second helical means being independent of said first helical means and having a lead opposite to the lead of said first helical means.

10. In a brake actuator, a rotatable input, a pair of rotatable outputs, a coupling mounted on said input for joining said input to said outputs and for rotating one of said outputs when said input is rotated and said outputs experience different reaction forces whose relative difference tends to prevent rotation of said other of said outputs, said coupling having longitudinal drive-connecting means for slidably mounting said coupling on said input shaft and preventing relative rotation between said input shaft and said coupling, said coupling further having first helical drive means for connecting one of said outputs to said coupling and second helical drive means having a lead opposite to the lead of the first helical drive means for connecting the other of said outputs to said coupling.

11. In a brake actuator, a rotatable input, first and second independently rotatable outputs, a coupling mounted on said input for joining said input to said outputs and for rotating one of said outputs when said input is rotated and said outputs experience different reaction forces whose relative difference tends to prevent rotation of said other of said outputs and further for rotating both of said outputs simultaneously when said outputs experience equal reaction forces, said coupling having longitudinal drive-connecting means for slidably mounting said coupling on said input shaft and preventing relative rotation between said input shaft and said coupling, said coupling further having first helical drive means for connecting one of said outputs to said coupling and second helical drive means having a lead opposite to the lead of the first helical drive means for connecting the other of said outputs to said coupling, said longitudinal drive-connecting means being connected at one end to one end of the first helical drive means and at the other end to one end of the second helical drive means, said helical drive means being coupled at their intermediate ends.

12. In a brake actuator, a rotatable input, first and second independently rotatable outputs, a coupling means supported by said input for rotating one of said outputs when said input is rotated and said outputs experience unequal retarding forces and for rotating both of said outputs simultaneously when rotation of said outputs is opposed by equal retarding forces, said coupling having longitudinal anti-friction means for slidably mounting said coupling means on said input shaft and preventing relative rotation between said input shaft and said coupling means, said coupling further having first helical drive means having a right-hand lead connecting said first outputs to said coupling and second helical drive means having a left-hand lead connecting said second output to said coupling, and said outputs having tracks in which said drive means are mounted.

13. In a differential mechanism for splitting input torque, a rotatable input, first and second independently rotatable outputs, a coupling means supported by said input for rotating one of said outputs when said input is rotated and said outputs experience unequal retarding forces and for rotating both of said outputs simultaneously when rotation of said outputs is opposed by equal retarding forces, said coupling having longitudinally extending anti-friction means for slidably mounting said coupling means on said input shaft and preventing relative rotation between said input shaft and said coupling means, said coupling further having first helically disposed anti-friction drive means having a right-hand lead connecting said first outputs to said coupling and second helically disposed anti-friction drive means having a left-hand lead connecting said second output to said coupling, and said outputs having opposed tracks with opposite leads in which said drive means are movably mounted.

14. The mechanism of claim 13 wherein said longitudinally-extending anti-friction means and said first and second helically disposed drive means are provided by a plurality of ball members.

15. The mechanism of claim 14 wherein said ball members form a recirculating ball train.

16. The mechanism of claim 14 wherein said ball members are separated by cage structures.

17. In a differential mechanism for splitting input torque to vehicle brakes, a rotatable input, first and second rotatable outputs, a coupling means on said input for rotating therewith, first and second output members mounted on said coupling, a ball race formed between said input, outputs and said coupling, said race including a straight portion formed between said input and coupling and a right-hand lead portion between said coupling and said first output and a left-hand lead portion between said coupling and said second output, said portions communicating with each other, a ball train in said race, said input when rotated being adapted to rotate both of said outputs simultaneously when equal retarding forces are experienced by the output member and being further adapted to rotate only one of said outputs when that output experiences a load less than the load experienced by the other of said outputs.

18. The mechanism of claim 17 wherein said outputs are juxtapositioned on said coupling, said outputs being separated by a bearing, a clamp member connecting said outputs for relative rotation and preventing axial separation.

19. In a differential mechanism for splitting input torque to vehicle brakes, a rotatable input, first and second rotatable outputs, a coupling means mounted on said input for rotation therewith, first and second output members rotatably mounted on said coupling, a first straight ball race formed between said input and said coupling, second and third ball races formed between said coupling and said outputs, said second and third ball races each defining a helix in the external portion of said coupling member, said second ball races having a lead opposite to the lead of said second ball race, a train of balls in each of said races, means spacing the balls of each train from each other, said coupling being axially movable on said apply shaft in response to input rotation when one of said outputs experiences a retarding load greater than that experienced by the other of said outputs, said axial movement of said coupling causing said output with the lesser load to rotate through an angle greater than the angle through which said input has been rotated.

20. The mechanism of claim 19 wherein said means spacing the balls of each said train is a cage member, said output members being juxtapositioned on said coupling, thrust bearing means preventing axial movement of said outputs axially toward and away from each other.

References Cited

UNITED STATES PATENTS

| | | | |
|---|---|---|---|
| 2,220,432 | 11/1940 | Wales | 74—650 |
| 2,664,766 | 1/1954 | Schmal | 74—650 |
| 2,841,036 | 7/1958 | Decker | 74—650 |
| 2,890,594 | 6/1959 | Galonska | 74—424.8 |
| 2,923,174 | 2/1960 | Gleasman | 74—650 X |
| 3,174,361 | 3/1965 | Deline | 192—50 X |

FOREIGN PATENTS

| | | |
|---|---|---|
| 700,304 | 12/1964 | Canada. |
| 736,494 | 7/1940 | Germany. |

ROBERT M. WALKER, *Primary Examiner.*

DAVID J. WILLIAMOWSKY, *Examiner.*

L. H. GERIN, *Assistant Examiner.*